United States Patent Office 3,494,195
Patented Feb. 10, 1970

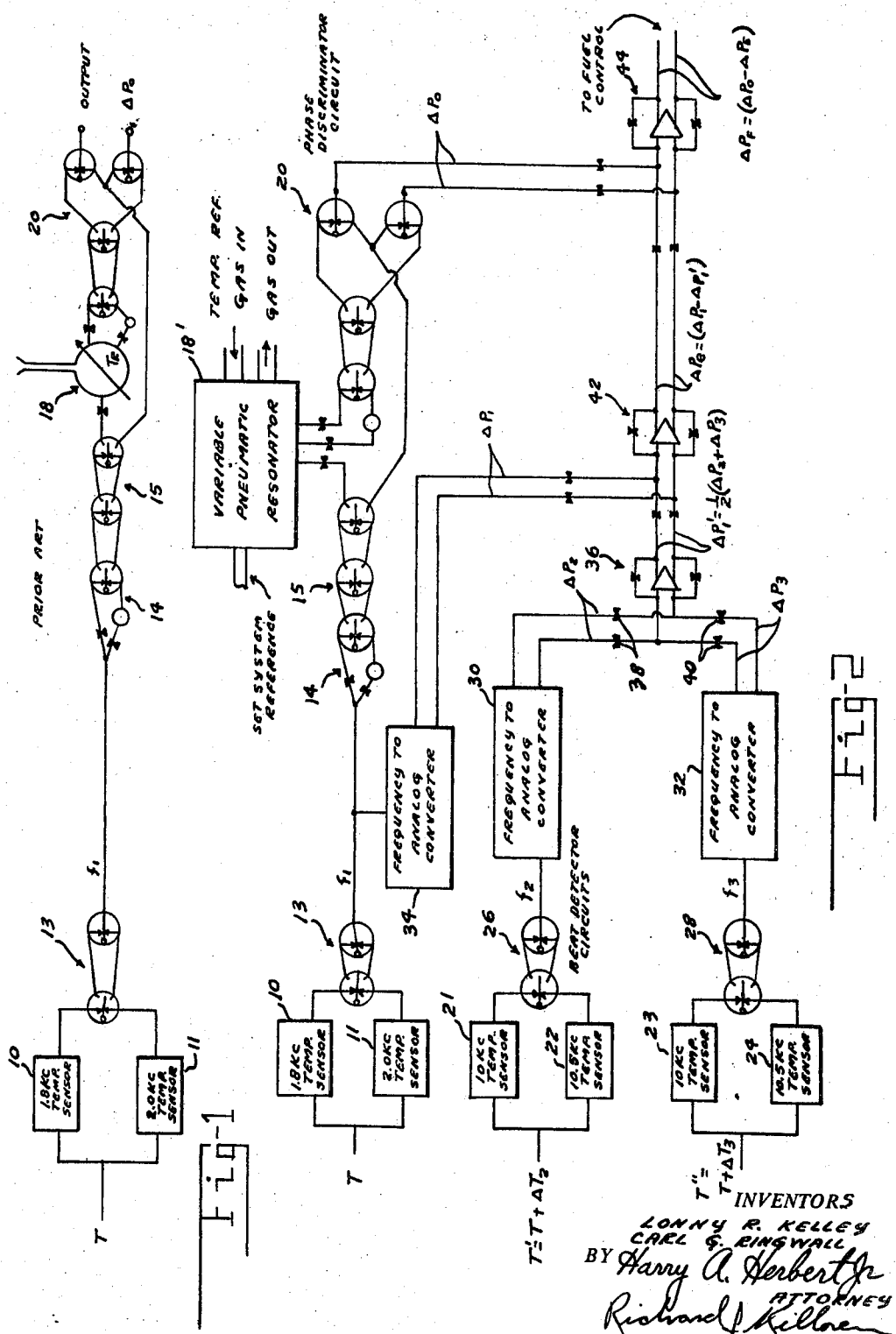

3,494,195
FLUIDIC TEMPERATURE CONTROL WITH TEMPERATURE AVERAGING SYSTEM
Lonny R. Kelley, Ballston Lake, and Carl G. Ringwall, Scotia, N.Y., assignors to the United States of America as represented by the Secretary of the Air Force
Filed Nov. 22, 1967, Ser. No. 685,111
Int. Cl. G01k 5/02
U.S. Cl. 73—340                         2 Claims

ABSTRACT OF THE DISCLOSURE

A system for sensing and controlling temperature for gas turbines has a primary control pressure signal $\Delta P_o$ obtained by frequency modulation techniques and comparison of the output of the frequency temperature sensors with a reference temperature in a variable pneumatic resonator and phase discriminator apparatus, the output signal is corrected for average temperature by using a plurality of small high-frequency sensors. A beat frequency for each pair of detectors is obtained in beat frequency detector circuits of the same type as used in the primary circuit. An average pressure signal $\Delta P_1'$ proportional to the average of the small sensors is obtained by means of frequency-to-analog circuits and an averaging circuit. This pressure signal is then compared with the output $\Delta P_1$ of a frequency-to-analog circuit connected in the output of the beat frequency detector of the primary circuit. The difference signal $\Delta P_e$ is then used to modify $\Delta P_o$.

BACKGROUND OF THE INVENTION

Fluidic devices have been used for sensing and controlling temperature for gas turbine engines. Frequency modulation techniques have been used for sensing of the temperature and phase modulation has been used for comparison of the sensed temperature with the reference value. See A Fluidic Temperature Control Using Frequency Modulation and Phase Discrimination by L. R. Kelley, pp. 123–131, Proceedings of Joint Automatic Control Conference at Seattle, Wash., August 1966.

It is sometimes desirable to measure temperature at several points and to use the average value as a control parameter. This could be accomplished by using a plurality of the circuits such as described in the referenced publication. This, however, would be very cumbersome.

SUMMARY OF THE INVENTION

According to this invention, the circuit disclosed in the referenced publication is used as the primary path through the system. The result of this path is an output pressure $\Delta P_o$ which indicates the difference between the temperature sensed by the sensors and the reference temperature. The pressure signal $\Delta P_o$ serves as a highly accurate control parameter which is corrected for average temperature by a pressure signal $\Delta P_e$. To obtain the pressure signal $\Delta P_e$, very small sensors operating at high frequencies are used.

BRIEF DESCRIPTION OF THE DRAWING

FIG. 1 is a schematic block diagram of a prior art fluid temperature control circuit; and
FIG. 2 is a schematic block diagram of a fluid temperature control circuit according to the invention.

DESCRIPTION OF THE PREFERRED EMBODIMENT

Reference is now made to FIG. 1 of the drawing which shows substantially the same prior art fluid temperature control circuit as described in the referenced article.
The outputs of two low-frequency temperature sensors 10 and 11 are applied to beat frequency detector circuit 13. The best frequency $f_1$ is then applied to decoupler 14, gain stage 15 and resonator 18 to which a reference temperature is applied and phase discriminator 20 to provide the output $\Delta P_o$ all as described in the referenced article. The resonator 18 is of the type shown on page 127 of the Kelley publication referenced above.

In FIG. 2 these elements are given like reference numbers. In addition to the circuit described with respect to FIG. 1, a plurality of pairs of high-frequency sensors 21, 22 and 23, 24 are located at other points on the gas turbine engine. The sensors 21 and 23 may be 10 kc. sensors with the sensors 22 and 24 being 10.5 kc. As pointed out in the Kelley publication referenced above, any pneumatic oscillator can be used as a temperature sensor. One such temperature sensor is described in the Kelley et al. patent application No. 562,450. The output of sensors 21 and 22 are supplied to beat detector circuit 26 to provide a beat frequency $f_2$ with the output of sensors 23 and 24 being supplied to beat detector circuit 28 to provide a beat frequency $f_3$. A beat frequency detector is described in Kelley's application Ser. No. 560,928, filed June 23, 1966 now Patent No. 3,412,745. The frequencies $f_2$ and $f_3$ are then applied to frequency-to-analog circuits 30 and 32, respectively. Circuits 30 and 32 may be of the type described in the application to Booth et al., Ser. No. 457,074—now abandoned with the subject matter now in continuation application No. 751,005. The outputs of circuits 30 and 32 are then supplied to an operational amplifier 36 through pneumatic resistance elements 38 and 40. The outputs signals of circuits 30 and 32 are halved by the resistance elements 38 and 40 and then summed in the operational amplifier 36 to provide the signal $\Delta P_1 = \frac{1}{2}(\Delta P_2 \Delta P_3)$.

The frequency $f_1$ besides being supplied to decoupler 14 is also applied to frequency-to-analog circuit 34 to provide an output $\Delta P_1$. The signal $\Delta P_1'$ is then subtracted from signal $\Delta P_1$ in an operational amplifier 42 to provide an error signal $\Delta P_e$.

The error signal $\Delta P_e$ is then subtracted from the signal $\Delta P_o$ in another operational amplifier 44 to provide a control signal $\Delta P_f$.

In the operation of the device, the output of beat detector 13 will be a frequency $f_1$. This signal is then compared with a reference temperature $T_R$ in pneumatic resonator 18' and phase discriminator 20 to provide an error signal $\Delta P_o$.

High-frequency sensors 21 and 22 for sensing temperature $T_2$ together with beat detector circuit 26 provide a beat frequency $f_2$ and sensors 23 and 24 together with beat detector 28 provide a beat frequency $f_3$. Analog pressure signals $\Delta P_1$, $\Delta P_2$ and $\Delta P_3$ for the frequencies $f_1$, $f_2$, and $f_3$, respectively, are provided in the output of frequency-to-analog converters 34, 30 and 32, respectively. Pneumatic resistance elements 38 and 40 are selected to halve the outputs of circuits 30 and 32. These pressure signals $\frac{1}{2}P_2$ and $\frac{1}{2}P_3$ are then summed in operational amplifier 36 to provide the pressure signal $\Delta P_1' = \frac{1}{2}(\Delta P_2 + P_3)$.

The signal $\Delta P_1'$ is then subtracted from the signal $\Delta P_1$ in the operational amplifier 42 to provide an error signal $\Delta P_e = (\Delta P_1 - \Delta P_1')$. The signal $\Delta P_e$ is then subtracted from $\Delta P_o$ in operational amplifier 44 to provide a fuel control signal $\Delta P_f = (\Delta P_o - \Delta P_e)$.

If temperatures T' and T" are equal to temperature T, $\Delta P_e$ will be zero and $\Delta P_f$ will be equal to $\Delta P_o$. If temperatures T' and T" are not equal to temperature T, $\Delta P_e$ will not be zero and $\Delta P_o$ will be corrected by a signal proportional to the average of temperatures T' and T".

There is thus provided a device for correcting a pressure fuel control signal in a gas turbine engine for average temperature which permits the use of very small high-frequency sensors and makes the duplication of the primary circuit unnecessary.

While a certain specific embodiment has been described, it is obvious that numerous changes may be made without departing from the general principles and scope of the invention.

We claim:

1. In a device for providing a temperature control pressure signal for use as a control in jet engines having two low-frequency fluidic temperature sensors with different natural frequencies located a predetermined position on the jet engine; a first beat frequency detector circuit connected to the outputs of said temperature sensors; means connected to the output of said frequency detector and including an adjustable pneumatic resonator and phase discriminator circuit, for comparing the sensed temperature with a reference temperature to thereby provide a pressure control signal; apparatus for correcting said pressure control signal for average temperature comprising; a first frequency-to-analog converter connected to the output of said first beat frequency detector; means for providing a pressure signal proportional to the average of the temperature at a plurality of other predetermined positions on the jet engine; means for subtracting said last-named pressure signal from the output of said first frequency to analog converter, to thereby provide an average temperature correction signal; means for subtracting said average temperature correction signal from said pressure control signal to thereby provide temperature control signal corrected for average temperature at a plurality of temperature sensing points.

2. The device as recited in claim 1 wherein said means for providing a pressure signal proportional to said average temperature includes a first and a second pair of high-frequency fluidic temperature sensors with the sensors in each pair having different natural frequencies; a second beat frequency detector connected to the outputs of said first pair of high-frequency temperature sensors; a third beat frequency detector connected to the outputs of the second pair of high-frequency temperature sensors; a second and third frequency-to-analog converter connected to the outputs of said second and third beat frequency detectors respectively; and means for providing a pressure signal proportional to the average of the outputs of said second and said third frequency-to-analog converters.

References Cited

UNITED STATES PATENTS 3,403,509 10/1968 Eastman _____ 73—339
3,412,745 11/1968 Kelley _____ 137—81.5

LOUIS R. PRINCE, Primary Examiner

DENIS E. CORR, Assistant Examiner

U.S. Cl. X.R.

73—357; 235—200